(12) United States Patent
Yang et al.

(10) Patent No.: US 8,710,958 B2
(45) Date of Patent: Apr. 29, 2014

(54) CONTAINERS HAVING RADIO FREQUENCY IDENTIFICATION TAGS AND METHOD OF APPLYING RADIO FREQUENCY IDENTIFICATION TAGS TO CONTAINERS

(75) Inventors: Tahua Yang, Woodridge, IL (US); Michael A. Berek, Grayslake, IL (US)

(73) Assignee: Abbott Laboratories, Abbott Park, IL (US)

( * ) Notice: Subject to any disclaimer, the term of this patent is extended or adjusted under 35 U.S.C. 154(b) by 1152 days.

(21) Appl. No.: 12/170,832

(22) Filed: Jul. 10, 2008

(65) Prior Publication Data
US 2010/0007501 A1   Jan. 14, 2010

(51) Int. Cl.
| | |
|---|---|
| *G08B 13/14* | (2006.01) |
| *G08C 19/16* | (2006.01) |
| *B01J 13/02* | (2006.01) |
| *G01N 31/22* | (2006.01) |
| *B29D 22/00* | (2006.01) |

(52) U.S. Cl.
USPC .................. 340/10.1; 340/572.1; 340/539.16; 340/870.11; 340/568.2; 264/4.33; 422/401; 428/34.1; 428/98; 343/726; 343/728; 343/741; 343/795

(58) Field of Classification Search
USPC ................................ 340/572.8, 10.1, 539.22
See application file for complete search history.

(56) References Cited

U.S. PATENT DOCUMENTS

| | | | |
|---|---|---|---|
| 4,334,462 A | * | 6/1982 | Hefling ........................... 99/385 |
| 4,767,298 A | | 8/1988 | Bocchicchio et al. |

(Continued)

FOREIGN PATENT DOCUMENTS

CA   2574683   2/2006

(Continued)

OTHER PUBLICATIONS

Buxton, Plastic joining—staking. Knowledge Summary [online]. TWI Ltd. 2001 [retrieved on Jan. 24, 2008] Retrieved from the internet: <URL: http://www.twi.co.uk/content/ksab004.html>, pp. 1-2.

(Continued)

*Primary Examiner* — Fekadeselassie Girma
(74) *Attorney, Agent, or Firm* — Hanley, Flight & Zimmerman, LLC

(57) ABSTRACT

A container having a radio frequency identification tag attached thereto by means of a stud or a radio frequency identification tag retainer projecting from the exterior surface of the container. The container can be used to contain medical products, and the container can be of various types, such as, for example, a bottle, a micro-well plate, a cartridge, a tube. In one embodiment, the container has a radio frequency identification tag affixed thereto. The container comprises a mouth, a neck, a body, and a bottom. The container can also have a closure, a septum, or an adapter for other components of an automated clinical analyzer. The neck is capable of receiving a closure. A stud or a radio frequency identification tag retainer projecting from the bottom of the container, preferably the center of the bottom of the container, serves to retain the radio frequency identification during the attachment of the radio frequency identification tag to the container. A radio frequency identification tag protector can be used to provide protection for the radio frequency identification tag.

41 Claims, 11 Drawing Sheets

(56) References Cited

U.S. PATENT DOCUMENTS

| | | | |
|---|---|---|---|
| 4,785,563 A * | 11/1988 | Friedman | 40/301 |
| 4,865,680 A | 9/1989 | Pierson | |
| 5,009,901 A * | 4/1991 | Byrne | 426/112 |
| 6,226,619 B1 * | 5/2001 | Halperin et al. | 705/23 |
| 7,070,053 B1 * | 7/2006 | Abrams et al. | 206/459.5 |
| 7,180,423 B2 | 2/2007 | Forster et al. | |
| 7,922,961 B2 | 4/2011 | Chisholm et al. | |
| 2003/0048187 A1 * | 3/2003 | Nolte | 340/572.8 |
| 2004/0027180 A1 * | 2/2004 | Usami | 327/143 |
| 2005/0050718 A1 * | 3/2005 | Kaelin et al. | 29/622 |
| 2005/0167044 A1 | 8/2005 | Exeter et al. | |
| 2005/0237195 A1 | 10/2005 | Urban | |
| 2006/0086756 A1 * | 4/2006 | Roth et al. | 222/129 |
| 2006/0145861 A1 | 7/2006 | Forster et al. | |
| 2006/0275100 A1 * | 12/2006 | Aukzemas | 411/353 |
| 2007/0069895 A1 * | 3/2007 | Koh | 340/572.1 |
| 2007/0079536 A1 * | 4/2007 | Hall | 40/299.01 |
| 2007/0182562 A1 * | 8/2007 | Abbott et al. | 340/572.8 |
| 2007/0191983 A1 * | 8/2007 | Griffits et al. | 700/213 |
| 2008/0012687 A1 | 1/2008 | Rubinstein | |
| 2008/0110774 A1 | 5/2008 | Chisholm et al. | |
| 2008/0111760 A1 * | 5/2008 | Sakama et al. | 343/860 |
| 2008/0183401 A1 * | 7/2008 | Davison et al. | 702/31 |

FOREIGN PATENT DOCUMENTS

| | | |
|---|---|---|
| EP | 1388810 A2 | 2/2004 |
| FR | 2923164 A1 | 5/2009 |
| WO | 9903585 A1 | 1/1999 |
| WO | 2006027054 A1 | 3/2006 |
| WO | 2009059687 | 5/2009 |

OTHER PUBLICATIONS

Gamma Sterilizable RFID Tags. Tech Sheet [online]. Gamma tag, Advanta Pure [retrieved on Jul. 8, 2008] Retrieved from the internet: <URL: http://www.advantapure.com/gamma-rfid-tags.htm>.

Heat Staking Sealing Machines and All Brands Tooling. [online]. Thermal Press International [retrieved on Jun. 3, 2008] Retrieved from the internet: <URL: http://www.thermalpress.com>.

Authorized Reseller of Extol Hot Plate Welders. Technical Description [online]. Plastic Assembly Technologies, Inc. [retrieved on Jun. 3, 2008] Retrieved from the internet: <URL: http://www.patsonics.com/extol_hotplateweld.htm>.

Plastics Joining [online]. Branson Ultrasonics Corporation [retrieved on Jun. 3, 2008] Retrieved from the internet: <URL: http://www.branson-plasticsjoin.com/ultrasonic_process.asp>, pp. 1,2.

Mold Manufacturing. [online]. Rexam PLC [retrieved on Jul. 7, 2008] Retrieved from the internet: <URL: http://http://www.rexam.com/sectors/index.asp?pageid=204>.

Radio Frequency Identification Device Technology (RFID). FactFile [online]. Institution of Electrical Engineers (the IEE), Aug. 2006 [retrieved on Nov. 13, 2008] Retrieved from the internet: <URL: www.theiet.org/factfiles/it/rfid.cfm>, pp. 1-15.

Swage. Encyclopedia [online]. Plastics Wiki [retrieved on Jun. 3, 2008] Retrieved from the internet: <URL: http://en.wikipedia.org/wiki/Swaging>, pp. 1-5.

Swaging Plastic Medical Device Parts, An Investigation of Eastman Copolyesters and Polycarbonate Performance. Brochure [online]. Eastman Specialty Plastics, Jun. 2007 [retrieved on Jul. 7, 2008] Retrieved from the internet: <URL: http://www.eastman.com/NR/rdonlyres/0C42C2C3-468F-49E1-BAE7-EE199C5686FD/0/PPM220.pdf>, pp. 1-4.

Rotary Swager and Vaill End Forming. Machinery Inc. [online]. Torrington Machinery [retrieved on Jun. 24, 2008] Retrieved from the internet: <URL: http://www.torrington-machinery.com/process/rotary_swaging.html>.

Ultrasonic plastic joining methods related to welding. [online]. PowerUltrasonics [retrieved on Jun. 3, 2008] Retrieved from the internet: <URL: http://www.powerultrasonics.com/content/ultra-sonic-plastic-joining-methods-related-welding>.

Crosby Catalog—Swaging Methods. [online]. [retrieved on Jun. 3, 2008] Retrieved from the internet: <URL: http://www.slingchoker.com/sling2/crosby/ii/ii53.htm>.

Manufacturing mettle. [online]. The Machinist [retrieved on May 20, 2008] Retrieved from the internet: <URL: http://www.etmachinist.com/jan_feb2004/tech03.html>.

Heat Staking Sealing Machines and All Brands Tooling. [online]. Thermal Press International [retrieved on Jan. 24, 2008] Retrieved from the internet: <URL: http://thermalpress.com/heatstaking.htm>.

The PCT International Search Report, PCT/US2009/049988, Date of mailing Sep. 25, 2009.

English Translation of Notification of Reasons(s) for Rejection, issued by the Japanese Intellectual Property Office in connection with Japanese Patent Application No. 2011-517584, Jul. 23, 2013, 5 pages.

International Searching Authority, International Preliminary Report on Patentability and Written Opinion issued for International Patent Application No. PCT/US2009/049988 on Jan. 11, 2011, 9 pages.

European Patent Office, Communication Pursuant to Article 94(3)EPC, issued for European Patent Application No. EP09790172.2, on Nov. 17, 2011, 6 pages.

European Patent Office, Communication Pursuant to Article 94(3)EPC, issued for European Patent Application No. EP09790172.2, on Aug. 3, 2012, 4 pages.

* cited by examiner

CONTAINERS HAVING RADIO FREQUENCY IDENTIFICATION TAGS AND METHOD OF APPLYING RADIO FREQUENCY IDENTIFICATION TAGS TO CONTAINERS

BACKGROUND OF THE INVENTION

1. Field of the Invention

This invention relates to containers for products, more particularly containers having radio frequency identification tags and methods for applying radio frequency identification tags to containers.

2. Discussion of the Art

In the area of medical diagnostics, and, more particularly, in the area of medical diagnostics that uses automated clinical analyzers, bar code labels are generally used to identify containers, such as, for example, reagent containers. Bar code labels can be applied to the surface of the container by means of various processes, such as, for example, printing. An unobstructed optical path is required in order to read a bar code label, which requirement results in design challenges with respect to both the container and bar code readers. The bar code label must be clear, i.e., the print quality thereof must be satisfactory and the label must be free from opaque foreign material, such as, for example, condensed water resulting from humidity and storage at low temperatures. Bar code labels generally have only a limited quantity of space, with the result that the quantity of information that can be written on a bar code label is extremely limited. Bar code labels can be removed and reused, thereby leading to the possibility of counterfeiting. Bar code labels can delaminate from the containers on account of condensation of water or low temperatures.

In the area of medical diagnostics, radio frequency identification tags and data capturing systems can be used to identify containers, so long as they comply with Food and Drug Administration (FDA) regulations for management of supply chains. The use of radio frequency tags to identify containers also allows for more flexibility in the design of the system with respect to the radio frequency identification tags and the readers of radio frequency identification tags, relative to bar code reader and bar code labels, because of the elimination of the line of sight requirement inherent with the use of bar code labels.

As used herein, the expression "radio frequency identification", or RFID, is a generic term for technologies that use radio waves to automatically identify objects, such as, for example, containers for biological samples, containers for reagents for analyzing biological samples, multi-well plates as processing vehicles for multiple biological samples, and reaction vessels for biological mixtures manipulation and signals detection. The most common method of identification is to store a series number that identifies the object or contents thereof, on a microchip that is attached to an antenna. The microchip and the antenna together are called a radio frequency identification transponder or radio frequency identification tag. The antenna enables the microchip to transmit the identification information and other information to a radio frequency identification reader. The radio frequency identification reader converts the radio waves reflected back from the radio frequency identification tag into digital information that can then be passed on to computers that can make use of it. Attaching radio frequency identification tags to containers for medical diagnostic supplies is also a convenient way reducing errors and complying with FDA regulations.

The current method of attaching radio frequency identification tags to containers, i.e., by means of a pressure-sensitive adhesive provides a low degree of adhesive strength and detracts from aesthetics, and increases the likelihood of counterfeiting, i.e., radio frequency identification tags can be removed and attached to counterfeit products. Radio frequency identification tags can be detached from surfaces during handling, shipping, upon changes in temperature or humidity, and other environmental fluctuations. The use of an insert molding method to attach radio frequency identification tags to containers, while feasible, has several drawbacks. These drawbacks include the requirement of complex, and, consequently, costly, molds, the difficulty of mass production, the difficulty of implementing robotics, and the difficulty of the selection of compatible materials.

Radio frequency identification tags attached to containers for reagents, such as, for example, bottles, cartridges, can be used to track information specific to the reagent, such as, for example, calibration controls, positive/negative cut-off values, shelf life, and information relating to production lots. Radio frequency identification tags attached to reagent containers can also be used to track the logistics and inventory of specific reagents.

Radio frequency identification tags attached to containers for samples, such as, for example, bottles, tubes, can be programmed to carry identification of the patient, testing history, time and place of collecting the sample, and outcome of diagnostic tests.

Radio frequency identification tags attached to reaction vessels, such as, for example, multi-well plates, can be used to store critical operating parameters/protocols as well as the information relating to reagents, as noted previously.

Radio frequency identification tags can be categorized as active, semi-passive, and passive radio frequency identification tags. The main difference between the three types of radio frequency identification tags resides in the nature of the power supply. There are three types of radio frequency identification tags: passive, active, and semi-passive. Passive radio frequency identification tags are battery-free data-carrying devices that react to a specific reader produced inductively coupled or radiated electromagnetic field, by delivering a data modulated radio frequency response. Passive radio frequency identification tags draw power from the reader, which emits electromagnetic waves that induce a current in the antenna of the radio frequency identification tag. Active radio frequency identification tags are radio frequency identification tags that have a transmitter to send back information, rather than reflecting back a signal from the reader, as the passive radio frequency identification tag does. Active radio frequency identification tags have their own power source (typically a long-life battery). The power source is used to provide power to the circuitry of the microchip and to broadcast a signal to a reader. Such activity is analogous to the manner in which a cellular telephone transmits signals to a base station. Semi-passive radio frequency identification tags are radio frequency identification tags having batteries, but they communicate using the same backscatter technique as do passive radio frequency identification tags. They use the battery to provide power to run the circuitry of a microchip and sometimes an onboard sensor. They have a longer read range than a regular passive radio frequency identification tag because all of the energy gathered from the reader can be reflected back to the reader. Active and semi-passive radio frequency identification tags are useful for tracking goods of high value that need to be scanned over long ranges, such as railway cars on a track. However, active and semi-passive radio frequency identification tags are more expensive than are passive radio frequency identification tags, thereby making their cost too expensive for objects having a low value.

However, future developments are expected to bring about a reduction in the cost of active radio frequency identification tags. Users often prefer passive radio frequency identification tags that utilize ultra-high frequency radio waves, which cost less than 40 U.S. cents per tag when ordered in volumes of one million tags or more. The range for reading passive frequency radio frequency identification tags that utilize ultra-high frequency radio waves is not as great as that of active radio frequency identification tags, e.g., less than 20 feet as compared with 100 feet or more for active radio frequency identification tags, but they are far less expensive than are active radio frequency identification tags and can be disposed of with the packaging for the object. FIG. 1 illustrates a typical radio frequency identification tag that comprises a microchip and an antenna.

The most critical obstacle for utilizing radio frequency identification tags is high cost. The cost of microchips and the assembly processes associated with radio frequency identification tags is high relative to the cost of typical diagnostic products. Radio frequency identification tags will be expensive, unless they can be mass-produced and applied to diagnostic products by means of a highly efficient automated process. In addition, counterfeiting can be carried out by removing the proper radio frequency identification tag and reattaching an improper radio frequency identification tag. The removed radio frequency identification tag can be applied to a container that contains a counterfeit product. Appearance of the container is also problematic, because attachment of radio frequency identification tags to containers results in a bumpy surface and a surface having a poor appearance. Still another problem is delamination of the radio frequency tag from the container. The scrap rate of a process for applying radio frequency identification tags to containers is high on account of the difficulty inherent in the placement of a microchip on the contacts of an antenna. Finally, liquid content in the containers of diagnostic product diminishes the signal of radio frequency; therefore, the placement of radio frequency identification tags for diagnostic products containing liquids is highly restricted.

U.S. Pat. No. 7,180,423 discloses radio frequency identification apparatus and methodology that enable a plurality of or all of the radio frequency identification tags in a stack of items that do not have a line of sight to a reader to be read. The radio frequency identification system includes radio frequency identification tags and a transmission line. The radio frequency identification tags are mountable to items to be read and include a radio frequency identification circuit that generates tag energy when activated by activation energy from a reader. The transmission line carries activation from the reader and tag energy from the tags. When carrying activation energy from the reader, the transmission line couples with and thereby enables activation of the plurality of tags. When the plurality of the tags is activated and generating tag energy, the transmission line couples with and carries the tag energy from the plurality of the tags. The transmission line is positioned in operative or coupling proximately to a plurality of the tags when the plurality of the tags is mounted to items and when the items are stacked. The transmission line can be configured as an elongated adhesive tape-like structure that can be adhered across a plurality of radio frequency identification tags mounted to a plurality of items. However, tags can be detached under harsh environmental conditions, such as low temperatures or high humidity during shipping and storage. Tags can be removed intentionally and reattached to other counterfeited products. U.S. Patent Application Publication No. 2005/0237195 discloses a thermoforming apparatus and method. A radio frequency identification tag is provided for molding into or attaching to a thermoformed article during the thermoforming process. The tag may be attached to the article by mechanical interlocking and/or a heat sensitive adhesive. The identification tag is applied to the article while the article is being formed in the thermoforming mold. The capital cost involving the robotic setup for placing the tag during forming process is high. The embodiment including hot melt adhesive to assist attachment poses additional challenges of mechanical and thermal controls during tag placement. U.S. Patent Application Publication No. 2007/0182562 discloses a method of making a plastic container having a radio frequency identification tag in a wall of the container. The method includes providing a mold having a mold core and mounting an insert on the core. The insert includes a radio frequency identification tag surrounded by a plastic housing, which preferably is retained on the core for example by heat of the core partially melting the housing. A plastic preform is formed in the mold around the core and the insert, preferably by injection molding, such that the insert is embedded in a wall of the preform. The preform is then blow molded into a plastic container having the insert embedded in a wall of the container. The insert is preferably mounted on an end of the core such that the insert is in the base wall of the container following blow molding. The radio frequency identification tag preferably is externally covered by plastic material in the preform as molded, and in the container as blow molded, so that the tag is not externally exposed in the preform or the container. U.S. Patent Application Publication No. 2008/0012687 discloses a container for pharmaceuticals, such as pills and tablets, having a radio frequency identification tag embedded within its wall. When the container is formed of a thermoplastic, the tag is preferably injected into the soft sidewall of the thermoplastic while it is at an elevated temperature and still in a moldable state. Both of the foregoing methods require the radio frequency identification tag assembly inside mold cavities. The cost of capital expenditure is expensive for such mechanical arrangements. The other disadvantage is that for thin-walled containers or small containers, the area and the thickness of the radio frequency identification tag renders the insert-molding process unfeasible. U.S. Pat. No. 7,070,053 discloses a method of maintaining, tracking, and identifying the integrity of a disposable specimen container comprising the steps of: writing to a radio frequency identification device attached to an individual specimen vial information including the date and a unique identification of the vial; putting sample in the specimen vial; writing to the radio frequency identification device attached to the specimen vial information including the time and the day; storing the vial in an environment to maintain its integrity; sending the vial to a laboratory for analysis; inventorying the vials by scanning the radio frequency identification device attached to the individual vials; and separating the radio frequency identification device from the vial so that the radio frequency identification device can be re-used. The design is prone to counterfeiting, although the cost of radio frequency identification device can be reduced due to the re-usability feature. U.S. Patent Application Publication No. 2005/0167044 discloses a method of producing self-adhesive labels carried on a release backing material. The method provides a plurality of self-adhesive carrier labels across the width of a web of carrier substrate with at least one discrete label component, such as a leaflet, booklet, hologram, and security device, being applied to each respective carrier label. The method provides a plurality of separate label component applicators across the width of the web, one for each respective label component to be applied.

There is also provided a registration means to ensure registration of each label component with its respective carrier label.

It would be desirable to develop a method, so that a radio frequency identification tag could be attached to a container or an apparatus with simple automated attaching process. The container having a radio frequency identification tag attached thereto should possess features that discourage counterfeit attempts. For diagnostic products, the radio frequency identification tag attached container or apparatus should be compatible to common interfaces for diagnostic instruments. Common features in the diagnostic instruments that interact with tagged container or apparatus including but not limited to mixing, aspiration, dispensing, heating, etc.

SUMMARY OF THE INVENTION

In one aspect, this invention provides a container having a radio frequency identification tag attached thereto by means of a stud or a radio frequency identification tag retainer projecting from the exterior surface of the container. The container can be used to contain medical products, and the container can be of various types, such as, for example, a bottle, a micro-well plate, a cartridge, a tube, a rack for holding containers.

In one embodiment, the container has a radio frequency identification tag affixed thereto. The container comprises a mouth, a neck, a body, and a bottom. The container can also have a closure, a septum, or an adapter for other components of an automated clinical analyzer. The neck is capable of receiving a closure. A stud projecting from the bottom of the container, preferably the center of the bottom of the container, serves to retain the radio frequency identification during the attachment of the radio frequency identification tag to the container. A radio frequency identification tag protector can be used to provide protection for the radio frequency identification tag. After the attachment of a radio frequency identification tag to the container, the radio frequency identification tag protector protects the radio frequency identification tag from damage during shipping, storage, and handling. The radio frequency identification tag protector can also function as a base to enable the container to rest on a flat surface of the type that may be encountered in a medical instrument, such as, for example, a radio frequency identification reader, automatic conveyor belt, surface heater, etc.

In another embodiment, the aforementioned stud projecting from the bottom of the container is replaced by a radio frequency identification tag retainer, which serves to retain the radio frequency identification during the attachment of the radio frequency identification tag to the container.

In another aspect, this invention provides a method for attaching a radio frequency identification tag to a container. The method comprises the steps of:
  (a) providing a container comprising a neck having an opening therein, a body surrounding an enclosed space, the body having a bottom, the container having a stud or a radio frequency identification tag retainer projecting outwardly from the bottom of the container;
  (b) mounting a radio frequency identification tag on the stud or the radio frequency identification tag retainer;
  (c) fixing the position of the radio frequency identification tag by means of deforming the stud or radio frequency identification tag retainer.

Additional optional steps include, but are not limited to, (d) sterilizing the container, (e) filling the container with a medical product, e.g., a reagent, and (f) programming the radio frequency identification tag.

Deforming the stud or the radio frequency identification tag retainer to secure the radio frequency identification tag is non-reversible, simple, fast, and easy to carry out by automated equipment. Attempts to remove the radio frequency identification tag will either damage the radio frequency identification tag or the container or both. Thus, the assembly of the container and the radio frequency identification tag can be used to prevent, or at least greatly reduce, counterfeiting of the medical product.

The radio frequency identification tag can be placed in a recessed position, e.g., within the radio frequency identification tag protector, so that the tag will be protected during shipping, handling, and storage. The container, with the attached radio frequency identification tag, can be placed on the surface of a radio frequency identification reader. The container is preferably flush against the radio frequency identification reader at the interface between the container and the radio frequency identification reader. The container can be placed in an automated clinical analyzer, such as for example, an automated clinical chemistry analyzer or an automated immunoassay analyzer. The container, with a radio frequency identification tag attached thereto, can be inserted into a mixing apparatus, an aspiration/dispensing module of a medical instrument, a heater, a sensor, as well as on a conveyor belt or a rack.

BRIEF DESCRIPTION OF THE DRAWINGS

In FIG. 7, the bottom of the container faces upwardly.

In FIGS. 8A and 8B, a radio frequency identification tag retainer is used in place of a stud.

In FIG. 9A, the die is shown to be not in contact with the radio frequency identification tag retainer. In FIG. 9B, the die is shown to be in contact with the radio frequency identification tag retainer.

DETAILED DESCRIPTION

Figure 1:
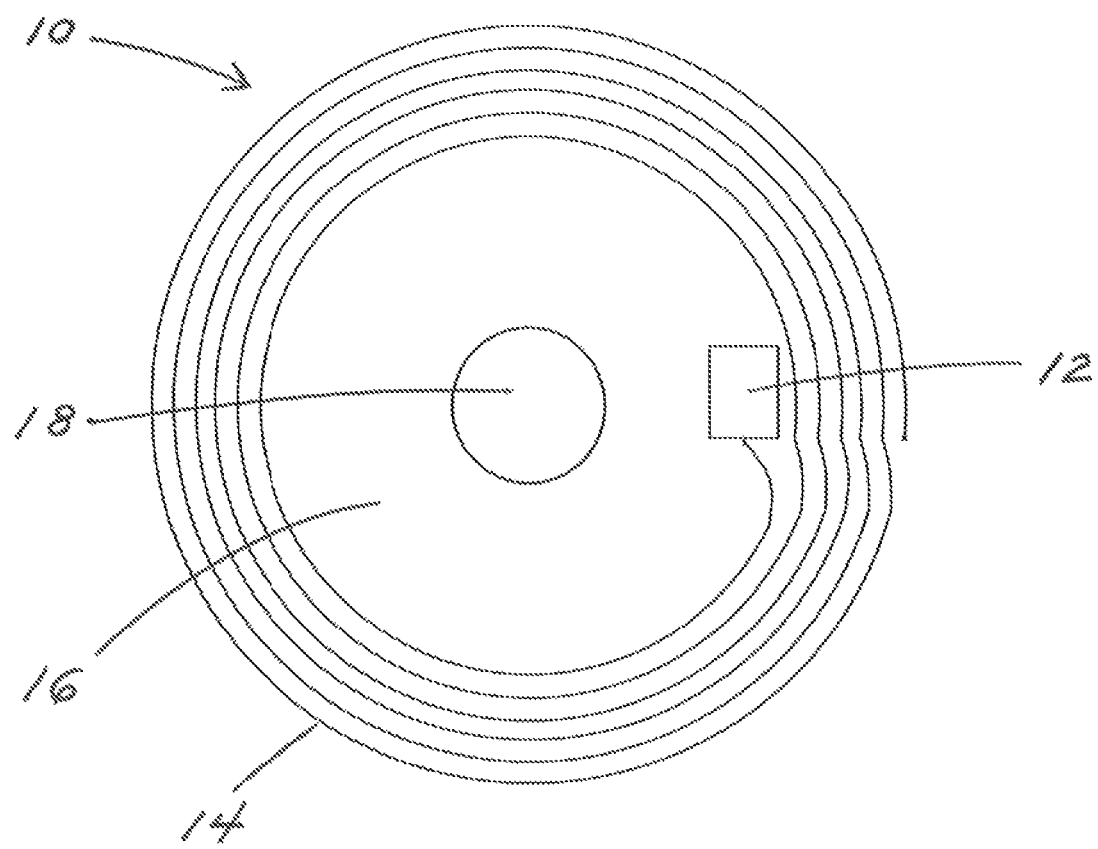
FIG. 1 is a top plan view, greatly enlarged, of a radio frequency identification tag.

As used herein, the expression "radio frequency identification system" means a system comprising a radio frequency identification tag made up of a microchip with an antenna, and a radio frequency identification interrogator or radio frequency identification reader with an antenna. The radio frequency identification reader sends out electromagnetic waves. The antenna of the radio frequency identification tag is tuned to receive these waves. A passive radio frequency identification tag draws power from the field created by the reader and uses it to power the circuits of the microchip. The microchip then modulates the waves that the passive radio frequency identification tag sends back to the radio frequency identification reader, which converts the waves received by the radio frequency identification reader into digital data.

As used herein, the term "microchip" means a miniaturized electronic circuit that has been manufactured on the surface of a thin substrate of semiconductor material. Radio frequency identification tags comprise at least one microchip. As used herein, the term "antenna", when referring to a radio frequency identification tag, means the conductive element of the tag that enables the tag to send and receive data. Passive, low frequency (135 kHz), and high frequency (13.56 MHz) tags usually have a coiled antenna that couples with the coiled antenna of the reader to form a magnetic field. Ultra-high frequency tag antennas can have a variety of shapes. As used herein, the term "reader", frequently referred to as an "interrogator", is an electronic device for performing the process of retrieving data from a transponder and, as appropriate, the contention and error control management, and channel and source decoding required to recover and communicate the data entered at the source. The device may also interface with an integral display and/or provide a parallel or serial communications interface to a host computer or industrial controller. A reader also has an antenna, which is used to emit radio waves. The radio frequency energy from the reader antenna is "harvested" by the tag antenna and used to power up the microchip, which then changes the electrical load on the antenna to reflect back its own signals.

As used herein, microchips in radio frequency identification tags can be "read-write microchip", "read-only microchip", or "write once, read many microchip". In the case of read-write microchips, information can be added to the radio frequency identification tag or existing information can be written over when the radio frequency identification tag is within range of a radio frequency identification reader. Read-write microchips usually have a series number that cannot be written over. Additional blocks of data can be used to store additional information about the items to which the radio frequency identification tag is attached. These radio frequency identification tags can be locked to prevent overwriting of data or encrypted to prevent the disclosure of proprietary data or disclosure of data that would compromise the privacy of a patient. Read-only microchips have information stored on them during the manufacturing process. The information on them can never be changed. Write once, read many microchips have a serial number written to them once, and that information cannot be overwritten later.

As used herein, the expression "active radio frequency identification tag" refers to a radio frequency identification tag having a transmitter and their own power source, typically a battery. The power source is used to run the microchip's circuitry and to broadcast a signal to a radio frequency identification reader. As used herein, the expression "passive radio frequency identification tag" refers to a radio frequency identification tag that draws power from the radio frequency identification reader, which sends out electromagnetic waves that induce a current in the tag's antenna. As used herein, the expression "semi-passive radio frequency identification tag" refers to a radio frequency identification tag that uses a battery to run the microchip's circuitry, but communicate by drawing power from the radio frequency identification reader. Any of the foregoing types of radio frequency identification tags can be used in the system of this invention.

As used herein, the expression "radio frequency identification tag protector" means an extension of a container that begins at the lower end of the body of the container and extends a distance sufficient to prevent a stud or a radio frequency identification tag retainer extending from the bottom of the container from contacting a surface upon which the radio frequency identification tag protector rests. As used herein, the expression "claw feature" means an element in the shape of a claw that functions to grip a seat attached to a medical instrument.

As used herein, the expression "medical instrument" means a clinical analyzer, such as, for example, an automated clinical analyzer, e.g., an automated immunoassay analyzer.

As used herein, the expression "cold swaging" means a forming technique, usually applicable to metals, but in the method described herein applicable to polymeric materials, in which the dimensions of an item are altered by means of a die or dies, into which the item is forced. Swaging is a forging process, usually performed cold; however, swaging can be performed on heated items.

As used herein, the expression "heating die" means a heating element inserted into a die to transfer heat energy to a component of a container being modified by a die. A heating die typically comprises heating elements, such as, for example, cartridge heaters, which are inserted into the heating die to provide a source of heat. The heating die can have a specified shape, whereby the heating die can readily process a material capable of being deformed by heat. The heating die can be operated either manually or automatically.

As used herein, the term "attach" means fasten on or affix to, or connect or join. As used herein, the term "mount" means secure firmly to a support or to place or fix on a support.

The symbol "(s)" following the name of an object indicates that either the object alone or a plurality of the objects is being referred to, depending upon the context of the statement surrounding the mention of the object or objects.

In the drawings, insofar as possible, like parts have like reference numerals.

FIG. 1 shows a radio frequency identification tag 10 having a microchip 12 and an antenna 14. The circular shape of the radio frequency identification tag 10 shown in FIG. 1 is but one example of the variety of shapes of radio frequency identification tags. The microchip 12 and the antenna 14 of the radio frequency identification tag 10 shown in FIG. 1 are supported on an insulating substrate 16, typically made of a polymeric material, the substrate having an opening 18 formed therethrough. Another embodiment of the container described herein can use a radio frequency identification tag that does not have an opening 18. This radio frequency identification tag will be described later. A representative example of a radio frequency identification tag suitable for use herein is the GammaTag™ gamma sterilizable radio frequency identification tag, commercially available from NewAge® Industries AdvantaPure®, Southampton, Pa. Additional information relating to radio frequency identification technology can be found in Radio Frequency Identification Device Technology (RFID), The Institution of Electrical Engineers, 2005, pages 1-19, incorporated herein by reference.

Figure 2:
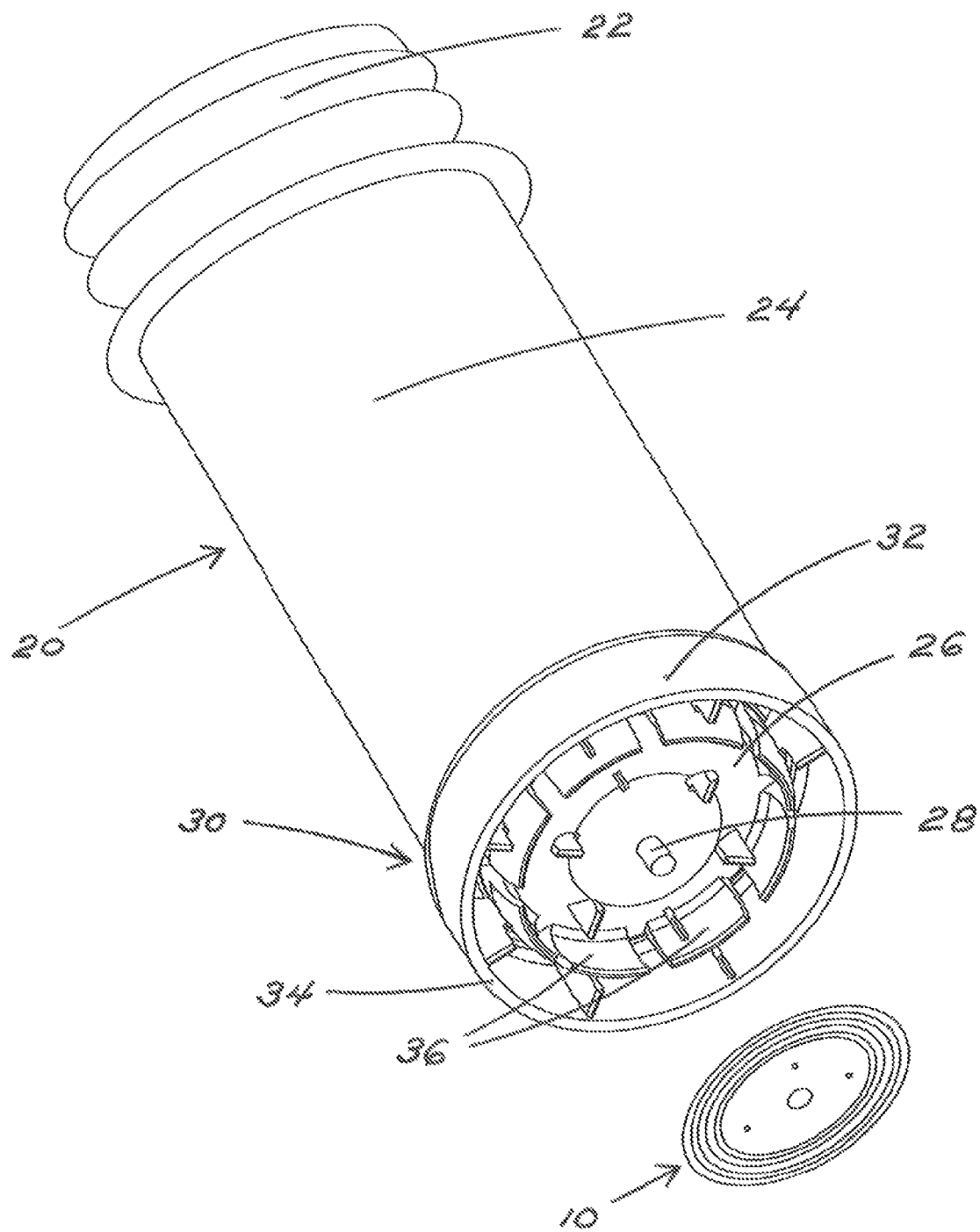
FIG. 2 is a perspective view of a container and a radio frequency identification tag before the radio frequency identification tag is attached to the container.

FIG. 2 shows a container 20 and a radio frequency identification tag 10, prior to attachment of the radio frequency identification tag 10 to the container 20. The container 20 comprises a neck 22, a body 24, and a bottom 26. The container 20 can also have a closure (not shown), a septum (not shown), or an adapter (not shown) for other components of an automated clinical analyzer (not shown). Although not visible in FIGS. 2, 3, 5, and 7, the neck 22 surrounds the mouth (not shown) of the container.

The neck 22 is capable of receiving the closure (not shown). The body 24 can be one of a variety of shapes, including the cylindrical shape illustrated in FIG. 2, so long as the container fulfills the requirements of diagnostic instrument. The bottom 26 is deeper at the center thereof than near the periphery thereof. For example, as shown in FIG. 2, the bottom 26 has a curved shape. Alternatively, the bottom can have a V-shape. It is preferred that the bottom 26 of a container 20 for liquid biological samples or liquid reagents have a shape in which the depth of the container decreases from the center to the periphery thereof so that the liquids aggregate in the center of the bottom 26 of the container 20 so that aspirating devices can recover as much of the liquid biological sample or liquid reagent as is physically possible with the equipment available for recovering the liquid. A stud 28 projects outwardly from the bottom 26 of the container 20. The stud 28, located at the center of the bottom 26 of the container 20, serves to retain the radio frequency identification tag 10 during the application of the radio frequency identification tag 10 to the container 20.

Figure 3:
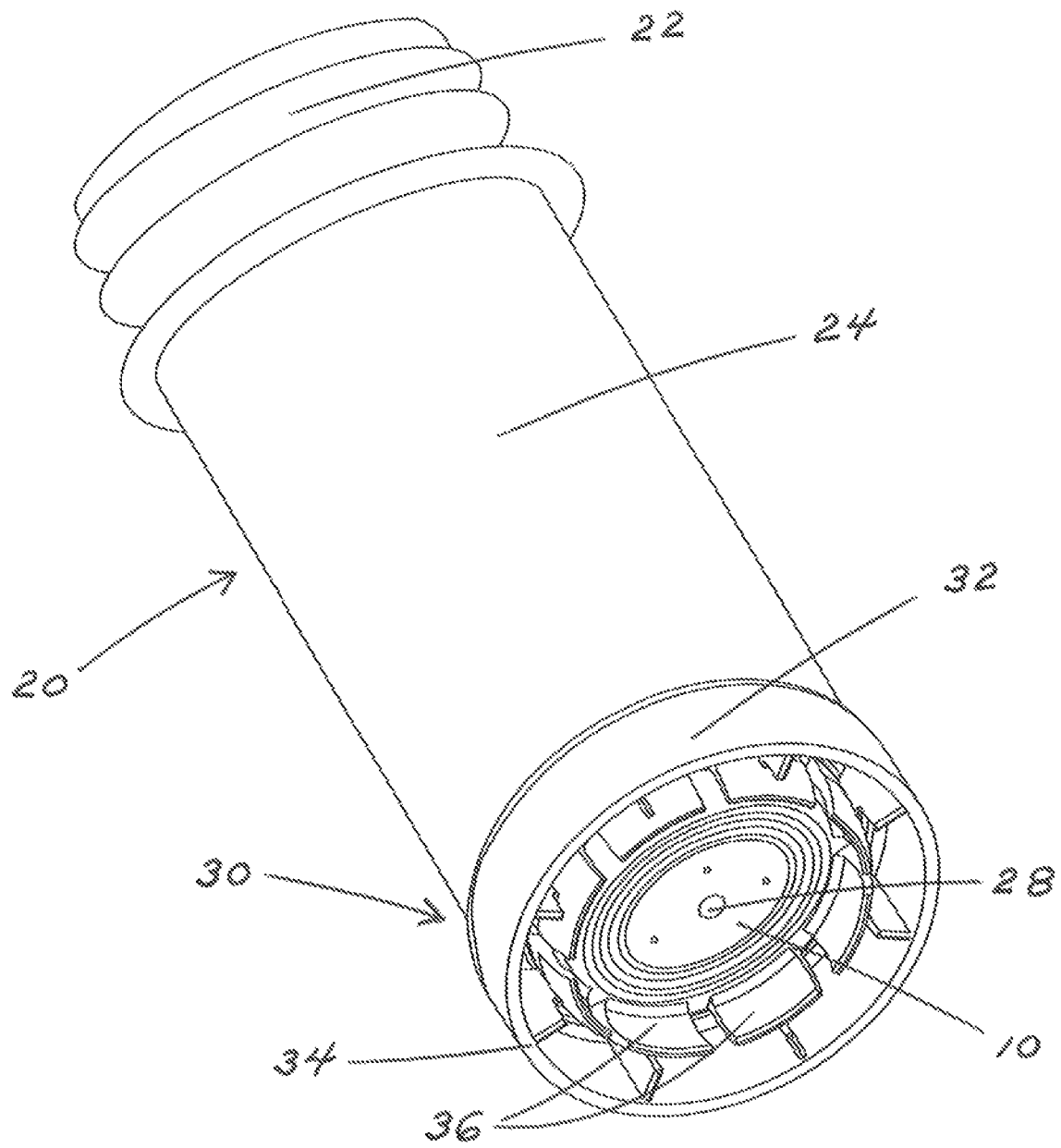
FIG. 3 is a perspective view of a container and a radio frequency identification tag after the radio frequency identification tag is attached to the container.

In the particular embodiment shown in FIG. 2, a radio frequency identification tag protector 30 can be used to provide protection for the radio frequency identification tag 10. The radio frequency identification tag protector 30 comprises an enclosure 32 and a rim 34 forming the outermost edge of the radio frequency identification tag protector 30. Shapes that are suitable for the enclosure 32 include, but are not limited to, hemispheres, cubes, etc. After the attachment of a radio frequency identification tag 10, the radio frequency identification tag protector 30 protects the radio frequency identification tag 10 from damage during shipping, storage, handling, and use in operations for which it was designed, e.g., use in an automated clinical analyzer. The radio frequency identification tag protector 30 can also function as a base to enable the container 20 to rest on a flat surface of the type that is normally encountered in a medical instrument (not shown), such as multi-well bottom reader, automatic conveyor belt, surface heater, etc. FIG. 3 shows a perspective view of the container 20 after a radio frequency identification tag 10 has been attached thereto.

The particular dimensions of the container 20, the radio frequency identification tag protector 30, the stud 28 and the radio frequency identification tag 10 are not critical, but a representative example of the dimensions of a typical container 20 calls for a height of three inches and a diameter of one inch. A representative example of the dimensions of a typical radio frequency identification tag protector 30 calls for a height of 0.375 inch and a diameter of 1.4 inches. A representative example of the dimensions of a typical stud 28 calls for a height of 0.06 inch and a diameter of 0.219 inch. A representative example of the dimensions of a typical radio frequency identification tag 10 calls for an outside diameter of 0.87 inch, a thickness of 0.03 inch, and an opening diameter of 0.23 inch.

Figure 4:
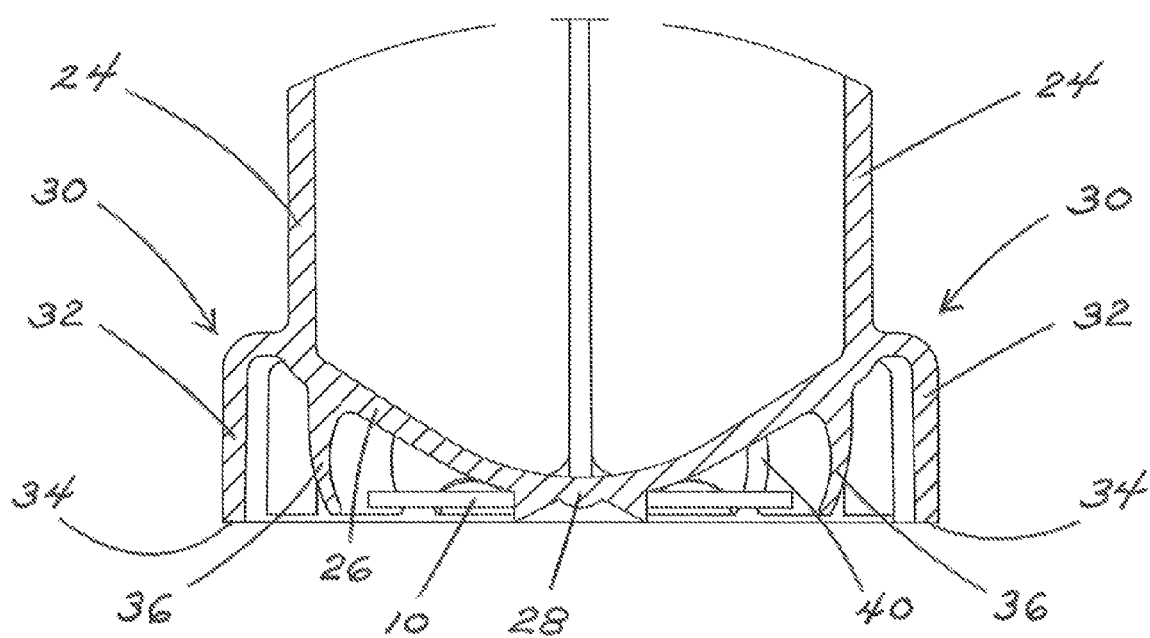
FIG. 4 is a cross-sectional view of the lower portion of a container to which a radio frequency identification tag has been attached.
Figure 5:
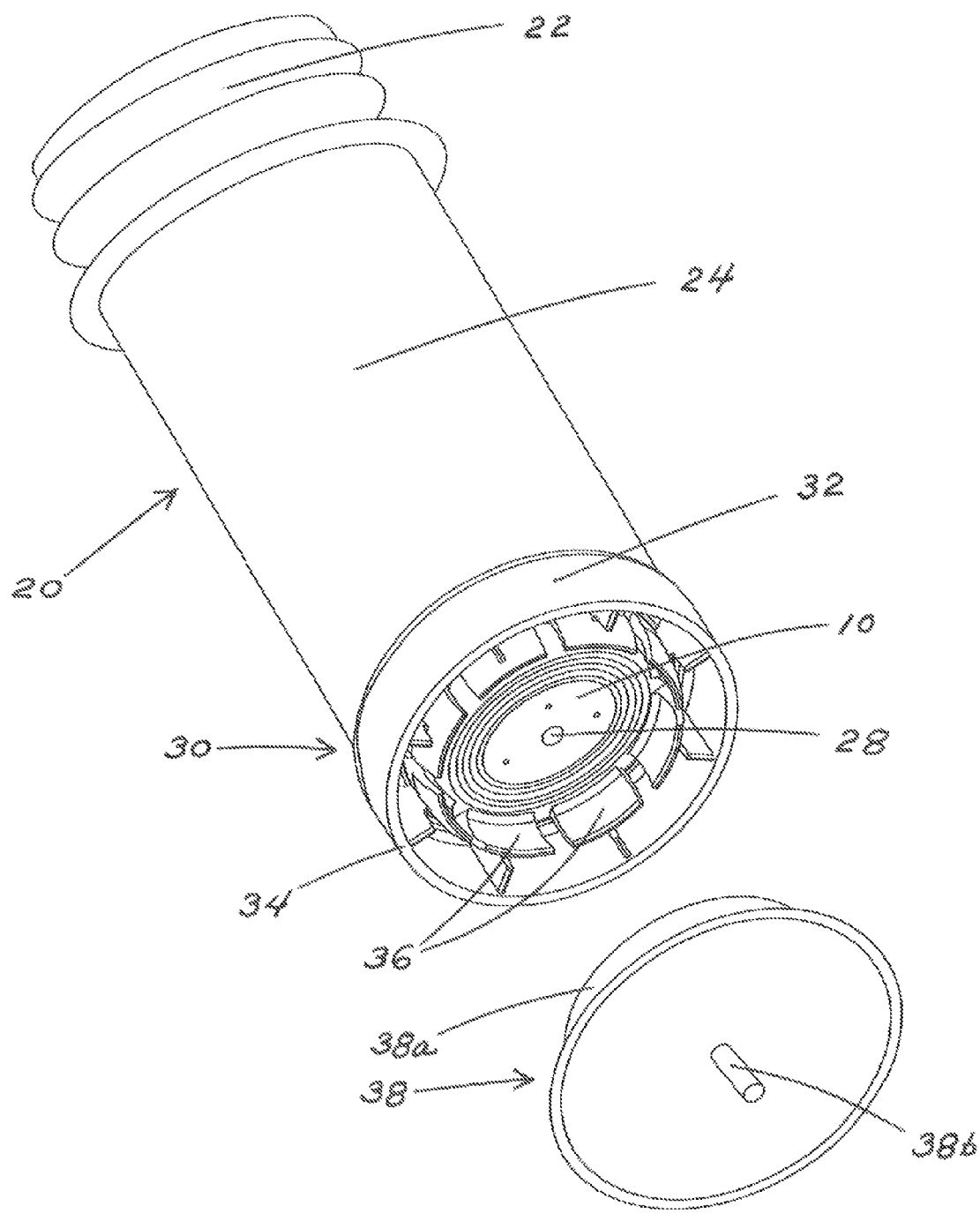
FIG. 5 is a perspective view of a container to which a radio frequency identification tag has been attached, and a container seat holder implemented in a medical instrument, e.g., an automated clinical analyzer.

FIGS. 4 and 5 show additional features of bottom 26. A claw feature 36 allows the container 20 to grip a seat 38 provided by the medical instrument to manipulate the container 20. The seat 38 enables the container 20 to be oscillated or rotated clockwise and counterclockwise during mixing, or moving containers on uneven surfaces. The claw feature 36 is sufficiently flexible, elastic, and resilient, such that the claw feature 36 can be sufficiently deformed so that it can be flexed radially to enable it to grip the seat 38 provided by the medical instrument. The claw feature 36 is also sufficiently rigid to enable the container 20 to be securely held on the seat 38 during any type of motion, such as for example, linear motion along a conveyor and twisting motion during rotation of the seat 38. The claw feature 36 can securely engage the seat 38 by means of a friction fit. One or more ribs 40 can also be provided as spacers and can be used as supports to keep the radio frequency identification tag 10 stable and level, relative to the surface upon which the container rests. Also shown in FIG. 5 is the seat 38 upon which the container 20 can be mounted when the container 20 is used in an automated medical instrument. The seat 38 includes a retention member 38a for retaining the container 20 and a post 38b for mounting the seat 38 on an automated medical instrument.

Figure 10A:
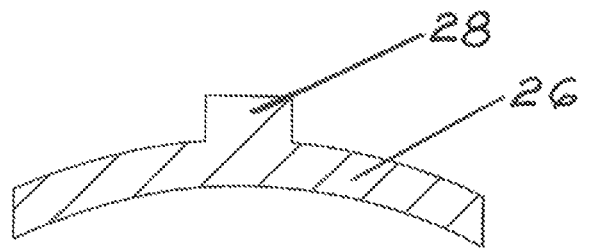
FIGS. 10A, 10B, and 10C are cross-sectional views of various embodiments for studs that facilitate alignment of a radio frequency identification tag with the stud during a staking process.
Figure 10B:
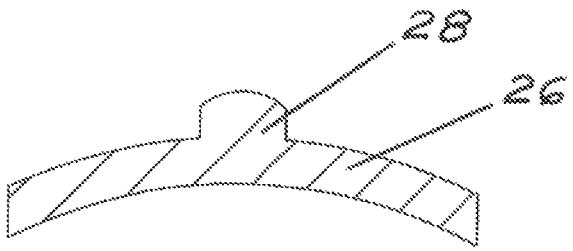
Figure 10C:
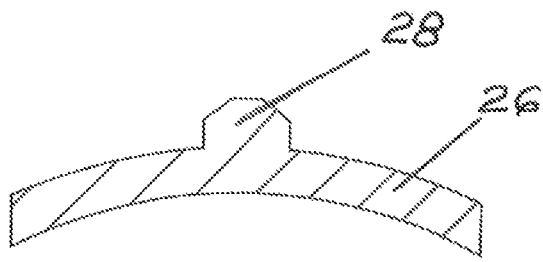

The stud 28 projecting from the bottom 26 of the container 20 is designed to be relatively insensitive to any alignment procedure. A dome-like or a tapered projection (not shown) on the stud 28 can be used to facilitate mounting of the radio frequency identification tag 10 onto the stud 28 without requiring precise positioning or placement. Various embodiments of the stud 28 are shown in FIG. 10A, FIG. 10B, and FIG. 10C.

Material suitable for preparing the container 20 include, but are not limited to, polymeric materials, such as for example, polypropylene, high density polyethylene, low density polyethylene, polystyrene, polycarbonate, polyvinyl chloride, acrylonitrile-butadiene-styrene copolymers, polyacrylates, thermoplastic polyesters, polyamides.

While the container shown in FIGS. 2, 3, 5, and 7 has the shape of a bottle, radio frequency identification tags can be attached to other types of containers by the techniques described herein. For example, the techniques described herein can be used to attach radio frequency identification tags to multi-well plates and racks for holding containers, e.g., racks for holding tubes, racks for holding bottles. In the case of multi-well plates and racks for holding containers, a stud or a plurality of studs is molded onto an exterior surface of the multi-well plate or the rack. The radio frequency identification tag(s) can be attached to the stud(s) in a manner similar to the manner in which the radio frequency identification tag is attached to a container having the shape of a bottle. It should also be noted that multi-well plates and racks for holding containers can have one stud or a plurality of studs. If the multi-well plate or the rack has one stud, the multi-well plate or the rack can have only one radio frequency identification tag attached thereto. If the multi-well plate or the rack has a plurality of studs, the multi-well plate or the rack can have a plurality of radio frequency identification tags attached thereto. It is also within the scope of this invention that the stud or plurality of studs of the multi-well plate or the rack for holding containers can be replaced by a radio frequency identification retainer or a plurality of radio frequency identification retainers.

The radio frequency identification tag can be applied to the container described herein by means of the following method:
(a) The container is formed by a molding process, e.g., injection molding, blow molding, in such a manner that the stud for receiving a radio frequency identification tag projects outwardly from the bottom of the container.
(b) A radio frequency identification tag is mounted onto the stud.
(c) The radio frequency identification tag is affixed to the stud by means of a plastic deformation process, preferably staking or swaging.

Molding processes suitable for use herein are well-known to those of ordinary skill in the art. Injection molding is described in *Encyclopedia of Polymer Science and Engineering*, Vol. 8, John Wiley & Sons, Inc. (1987), pages 102-138, incorporated herein by reference. Compression molding is described in *Encyclopedia of Polymer Science and Engineering*, Vol. 4, John Wiley & Sons, Inc. (1986), pages 79-108, incorporated herein by reference. Transfer molding is described in *Encyclopedia of Polymer Science and Engineering*, Vol. 4, John Wiley & Sons, Inc. (1986), pages 79-108, incorporated herein by reference. Reaction injection molding is described in *Encyclopedia of Polymer Science and Engineering*, Vol. 14, John Wiley & Sons, Inc. (1988), pages 72-100, incorporated herein by reference. Extrusion blow molding is described in *Encyclopedia of Polymer Science and Engineering*, Vol. 2, John Wiley & Sons, Inc. (1985), pages 447-478, incorporated herein by reference. Injection blow molding is described in *Encyclopedia of Polymer Science and Engineering*, Vol. 2, John Wiley & Sons, Inc. (1985), pages 447-478, incorporated herein by reference. Other forming processes that can be used to form the container include thermoforming and compression molding. Equipment for molding processes is commercially available from Rexam PLC, Buffalo Grove, Ill. It is also within the scope of this invention that the stud can be replaced by a radio frequency identification retainer.

The container can then be sterilized by means of gamma radiation. Following the sterilization step, the container can be filled with its contents, e.g., reagents. Then, the radio frequency identification tag can be programmed at the completion of the filling step.

Figure 6A:
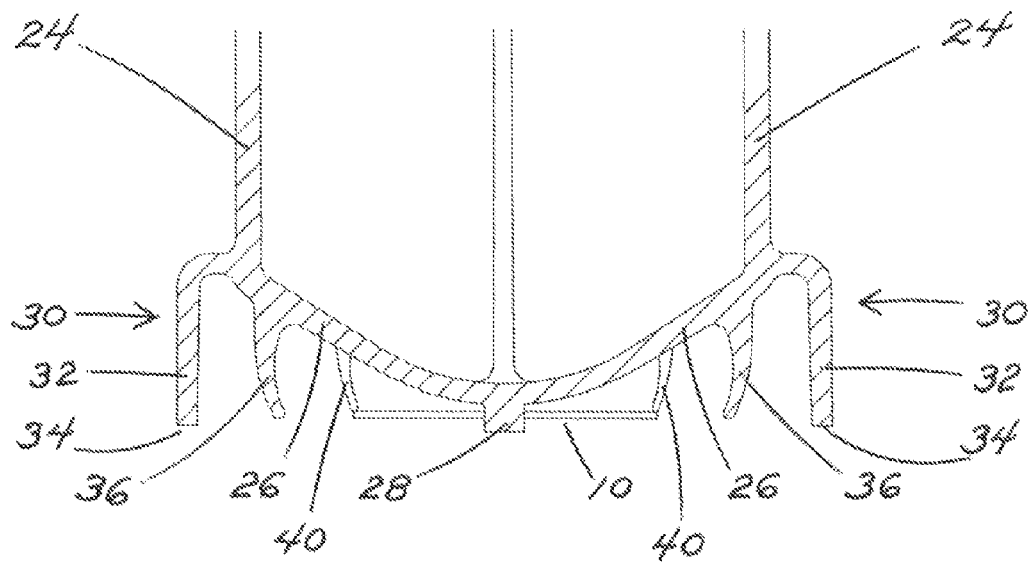
FIG. 6A is a cross-sectional view of the bottom of a container and a radio frequency identification tag, before a staking process has been performed.
Figure 6B:
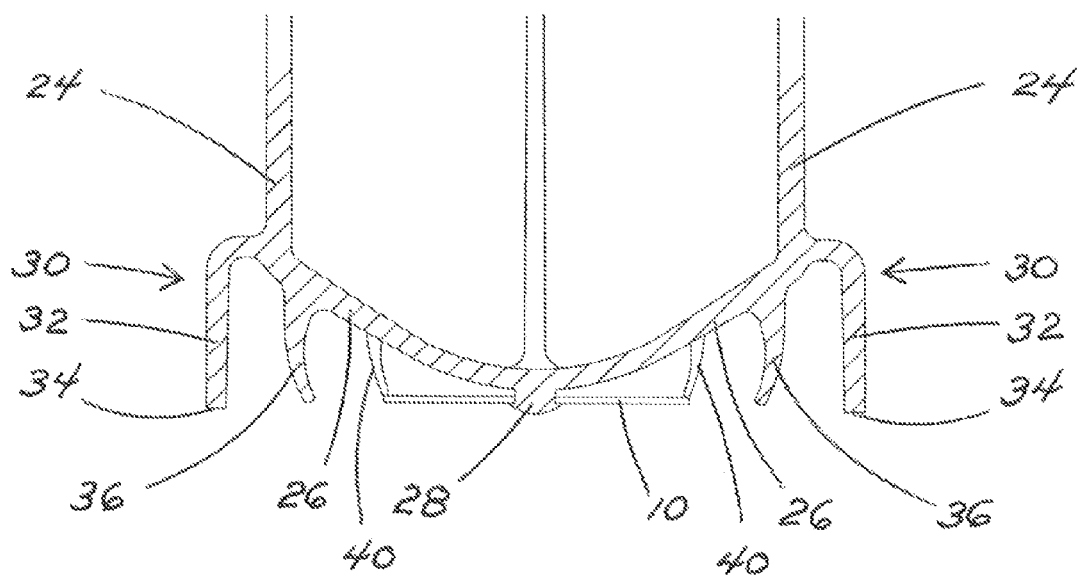
FIG. 6B is a cross-sectional view of the bottom of a container and a radio frequency identification tag, after a staking process has been performed.

FIGS. 6A and 6B shows the container 20 with a radio frequency identification tag 10 before, i.e., FIG. 6A, and after, i.e., FIG. 6B, a staking process. The stud 28 at the container bottom 26 is partially melted to enable the stud 28 to retain the radio frequency identification tag 10 upon the stud 28. Because common thermoplastic polymers, such as, for example, polyethylene or polypropylene, are used for the container, partial melting of the stud 28 enables the stud 28 to be reshaped to a specified geometry by means of a die and deformation of the polymeric material. Once applied, the radio frequency identification tag 10 cannot be removed from the container 20 without severely damaging the radio frequency identification tag 10 or the container 20. The invention provides a means to reduce counterfeiting, because of the permanent placement of the radio frequency identification tag on the container.

As used herein, the term "staking" means a process wherein a stud protruding from one component fits into a hole in a second component. The stud is then deformed through the cold flow or melting of the plastic to form a head, which mechanically locks the two components together. Unlike welding techniques, staking has the capability of joining plastics to other materials (e.g., metal) in addition to joining like or dissimilar plastics, and it has the advantage over other mechanical joining methods in eliminating the need for consumables such as rivets and screws. There are four methods of staking: cold staking, heat staking, thermostaking, and ultrasonic staking. The method selected is dependent upon the materials to be joined, the loads to which the assembly will be subjected, and the appearance desired. Accurate alignment of the components is important and the common design parameters include diameter, height, and geometry of the stud. Due to the deformation of previously formed parts, staking is restricted to thermoplastic materials. In cold staking, the stud is deformed through the application of high pressure. Cold flow subjects the stud to high stresses and consequently, it is only suitable for use with the more malleable plastics. The high pressures also render this technique unsuitable for the formation of tight assemblies. Polymers that are amenable to the cold staking process typically possess low yield strength, such as, for example, low density polyethylene, linear low density polyethylene, high density polyethylene, polypropylene, poly(vinyl chloride), Nylon, and poly(tetrafluoroethylene). These polymers normally exhibit yield strength less than 9,000 psi. However, other polymers having high yield strength but amorphous structures are also suitable for use with the invention described herein, such as amorphous polysulfone and polycarbonate. In heat staking, a compression die is heated so that less pressure is required to form a head on the stud, thereby widening the application of staking to a broader spectrum of thermoplastic materials than is possible with cold staking. Thermoplastic materials amenable to heat staking include, but are not limited to, glass-filled thermoplastic materials. The quality of the joint is dependent on control of the processing parameters: temperature, pressure, and time—a typical cycle time ranging from 1 to 5 seconds. The staking method also has the flexibility to allow the simultaneous formation of a large number of studs and to accommodate a variety of designs for heads of studs. The staking method also allows for materials having higher yield strength to be used. Techniques of heat staking are also described in U.S. Pat. No. 4,767,298, incorporated herein by reference. In thermostaking or hot air staking, heat is applied to the stud by means of a stream of superheated air, delivered through a tube that surrounds the stud. A separate cold die is then lowered to compress the head of the stud. A variety of designs for heads of studs are feasible by changing the design of the tip of the compression die. Thermostaking is a high speed, low cost process and due to its highly controllable nature, it is especially advantageous in applications involving decorative surface finishes. In ultrasonic staking, the stud is melted using ultrasonic energy supplied through a welding horn. During the continued pressure of the horn, the melted material of the stud flows into the cavity within the die to form the required design of the head. Cycle times are typically less than two seconds, and welding can be performed with a hand-held welding head. The technique of ultrasonic staking is described in U.S. Pat. No. 4,865,680, incorporated herein by reference, for various alternatives. The ultrasonic control module, horn, and required fixtures are commercially available from Branson Ultrasonics Corporation, Danbury, Conn. Ultrasonic joining is further described in How does ultrasonic assembly work? Datasheet [online]. Branson Ultrasonics Corporation, 2008 [retrieved on 2008-06-03]. Retrieved from the Internet: <URL: http://www.branson-plasticsjoin.com/ultrasonic_process.asp>, incorporated herein by reference. The staking processes are versatile and can easily be structured for preparing a plurality of assemblies comprising radio frequency tags and containers in a single stroke. The staking processes are easily programmable for automated processes. Staking machines are commercially available through many thermal press machine companies, such as, for example, Thermal Press International, Livermore, Calif. Staking techniques are further described in Buxton. Plastic Joining-staking. TWI Knowledge Summary [online], [retrieved on 2008-01-24]. Retrieved from the Internet: <URL: http://www.twi.co.uk/j32k/protected/band_3/ksab004.html>; Heat Staking Heat Sealing Machines And All Brands Tooling. Datasheet [online]. Thermal Press International, 2008 [retrieved on 2008-06-03]. Retrieved from the Internet: <URL: http://www.thermalpress.com/>, both of which are incorporated herein by reference.

Figure 7:
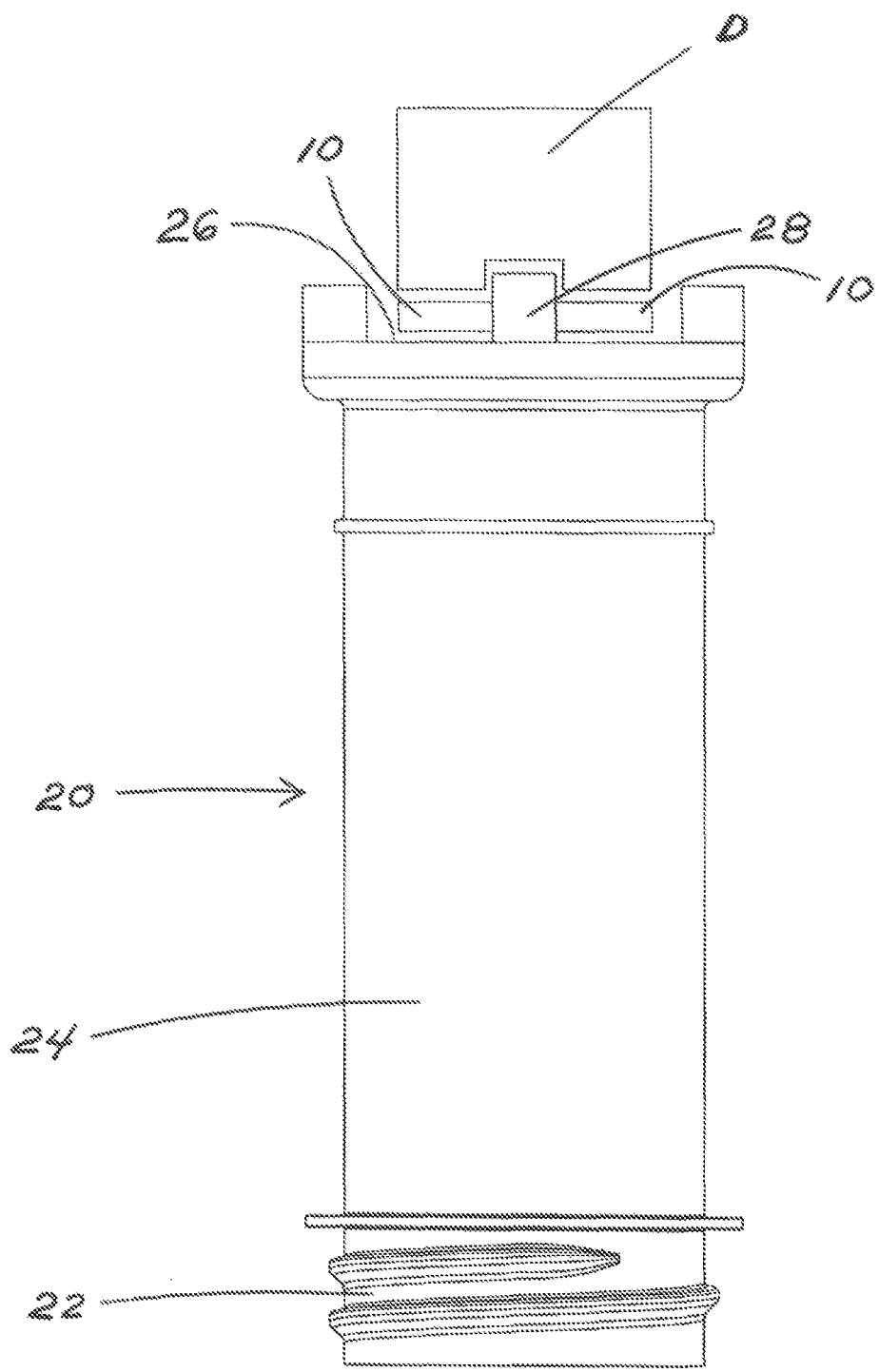
FIG. 7 is a side view in elevation of a heated die suitable for a staking process wherein a radio frequency identification tag is attached to a container.

FIG. 7 illustrates the arrangement of a die "D" suitable for heat staking. The shape of stud 28 after it has been partially melted depends on the shape of the heat-staking die "D". In the staking process, the stud 28 of the container 20 fits into the hole (not shown) of the radio frequency identification tag 10. The stud 28 is then deformed under pressure or heat or both pressure and heat through cold flow or melting or both cold flow and melting. The deformed stud 28 mechanically locks the container 20 and radio frequency identification tag 10 together. Because there is no chemical bonding between the container 20 and radio frequency identification tag 10, compatibility of the materials is not critical. In other welding techniques, such as ultrasonic welding, spin welding, and heat welding, incompatible materials cannot be bonded to one another. The staking process is versatile, simple, cost-effective, consistent, and is capable of being automated. The staking process is also preferred over other mechanical joining methods because there is no need for consumables, such as rivets and screws.

Figure 8A:
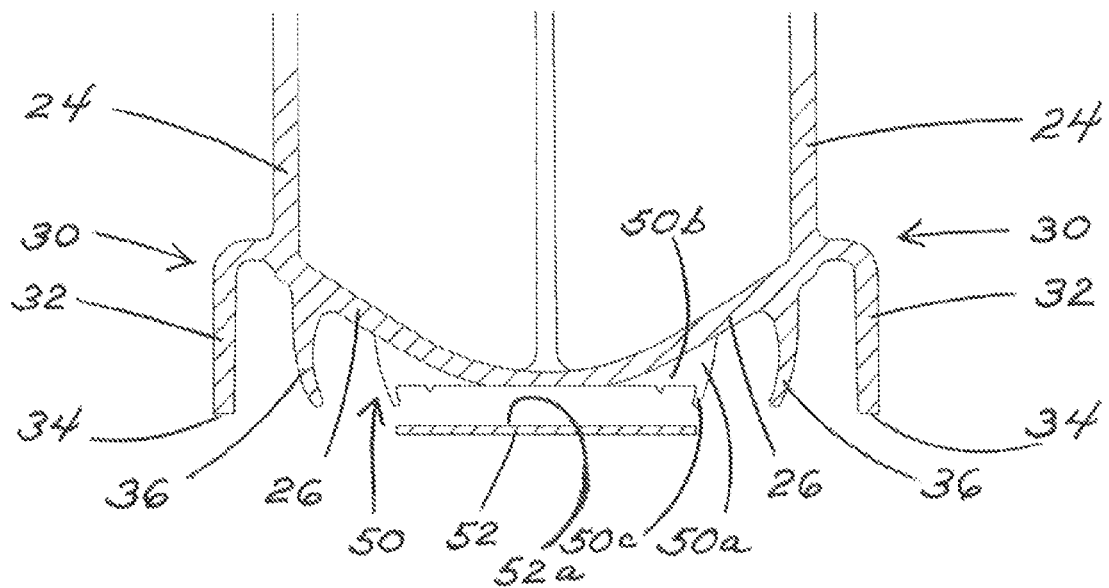
FIG. 8A is a cross-sectional view of the bottom of a container and a radio frequency identification tag, before a swaging process has been performed.
Figure 8B:
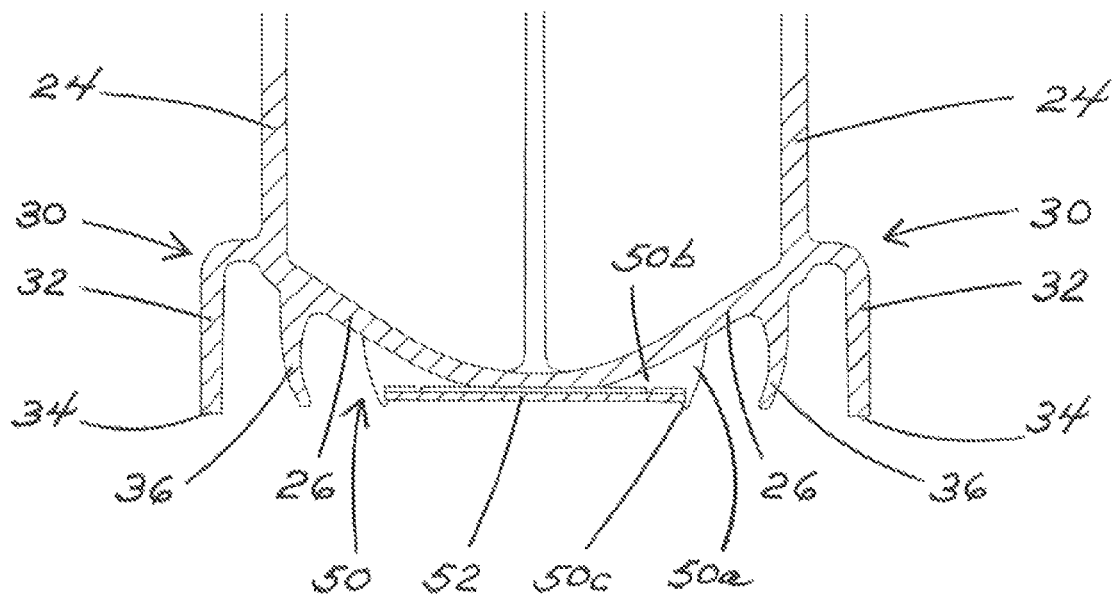
FIG. 8B is a cross-sectional view of the bottom of a container and a radio frequency identification tag, after a swaging process has been performed.
Figure 9A:
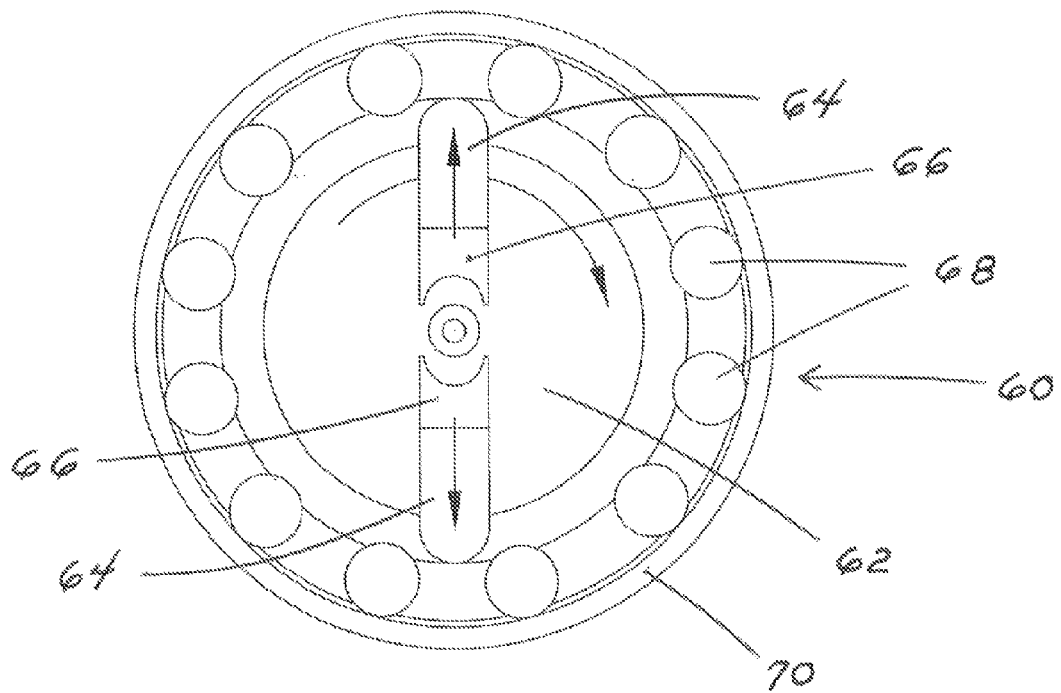
FIGS. 9A and 9B are schematic diagrams of a rotary swaging die for the swaging process.
Figure 9B:
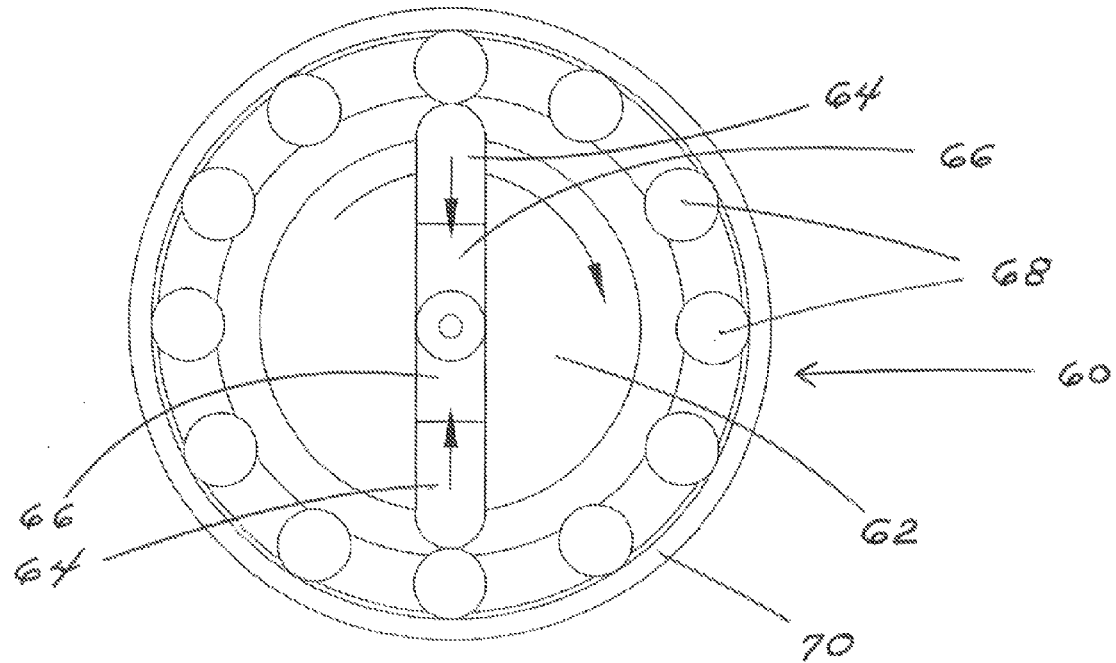

FIGS. 8A and 8B show a swaging process, in which a radio frequency identification tag 10 is attached to a container 20. In FIGS. 8A and 8B, the stud described in the embodiment shown in FIGS. 2, 3, 4, and 5 is replaced by a radio frequency identification tag retainer 50. As shown in FIGS. 8A and 8B, the radio frequency tag retainer 50 comprises an annular element 50a having an annular spacing ring 50b inset from the periphery from the annular element 50a and a deformable rim 50c at the periphery of the annular element 50a. In order to attach a radio frequency identification tag 52 to the container 20, the radio frequency identification tag 52 is inserted into the recessed area encircled by the deformable rim 50c. After the radio frequency identification tag is positioned properly, i.e., so that the upper surface 52a of the radio frequency identification tag 52 is in contact with the annular spacing ring 50b, a rotary swaging device, as shown in FIGS. 9A and 9B can be used to push the deformable rim 50c inwardly, whereby the deformable rim 50c deforms to a sufficient extent to grip the radio frequency identification tag 52 and securely retain the radio frequency identification tag 52. By using a radio frequency identification tag retainer 50 instead of a stud, the radio frequency identification tag 52 is not required to have an opening, e.g., opening 18, formed therein. Most of the swaging process is similar to a cold flow process, e.g., the cold staking process, but with much higher precision with respect to the deformation of the radio frequency tag retainer 50.

The most common swaging process is a rotary swaging process. The rotary swaging process is a cold forming process for reducing cross section of an object, typically an object having a cylindrical shape. However, it is not required that the object have a cylindrical shape. A swaging machine operates by using two, three, or four split dies, which separate and come together up to 1000 times per minute. A split die is a die made of parts that can be disassembled to facilitate removal of the workpiece. Radial force is exerted by the reciprocating motion of the split dies upon the workpiece. Referring now to FIGS. 9A and 9B, a swaging apparatus 60 comprises a motorized spindle 62, which is slotted, in order to hold backers 64 and split dies 66. The backers 64 are attached to the split dies 66. The spindle 62 passes the backers over a series of rollers 68. In the rotary swaging process, the head 70 is fixed. The split dies 66 close over the workpiece, i.e., the radio frequency identification tag retainer 50, and form the material making up the radio frequency identification tag retainer 50. When the backers 64 are in-between two roller positions, the centrifugal forces will move them apart, making it possible for the die to open, while the dies are rotating around the workpiece. The operation continues several times and the result is a reduced round cross section of the workpiece. The rotary machine can have two, three, or four dies and can be adapted to swage cold or hot material. The arrows in FIGS. 9A and 9B indicate the direction of motion of the backers 64 and the motorized spindle 62. Swaging equipment is commercially available from Torrington Swager and Vaill End Forming Machinery Inc., Waterbury Conn. Additional information relating to swaging can be found at Process Rotary Swaging. Datasheet [online]. Torrington Swager and Vaill End Forming Machinery Inc., 2008 [retrieved on 2008-06-24] Retrieved from the Internet: <URL: http://www.torrington-machinery.com/process/rotary_swaging.html>; Swage [online]. Wikipedia, the free encyclopedia, 2008 [retrieved on 2008-06-03]. Retrieved from the Internet: <URL: http://en.wikipedia.org/wiki/Swaging>, both of which are incorporated herein by reference. Although a swaging technique is shown only with respect to the radio frequency identification tag retainer 50, a swaging process can be used to deform the stud 28.

In addition to staking techniques and swaging techniques, other techniques suitable for the deformation of the stud or the radio frequency identification tag retainer projecting from the container include hot plate welding, ultrasonic joining, radio frequency joining, and induction bonding.

FIGS. 10A, 10B, and 10C illustrate feature enhancements for the stud 28 at the bottom of the container 20. The illustration shows a view of the bottom 26 of the container 20 and the radio frequency identification tag 10 to reflect the orientation of the radio frequency identification tag 10. During automated processes for applying radio frequency identification tags to containers, the alignment of the radio frequency identification tag to the container can be relaxed, if the stud 28 is a simple cylindrical stud 28 having a flat tip, as shown in FIG. 10A. In FIG. 10B, the shape of the stud 28 is shown to be rounded. In FIG. 10C, the shape of the stud 28 is shown to be chamfered. A stud 28 having a rounded tip or chamfered tip provides a self-aligning feature when the radio frequency identification tag is sufficiently close to the location of the stud 28. This feature typically allows an additional 0.010 inch to 0.050 inch of tolerance depending on the size of the stud.

Figure 11:
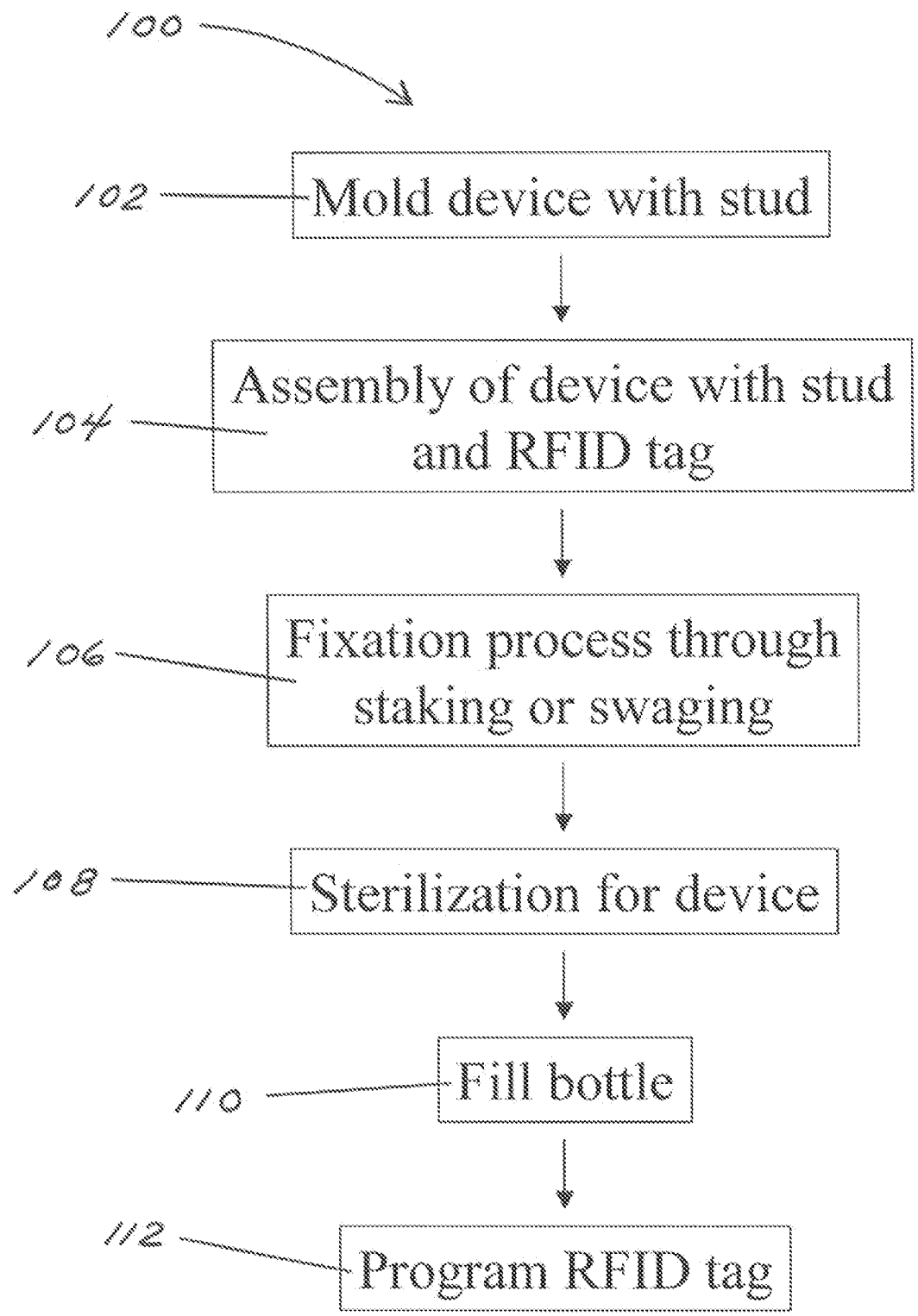
FIG. 11 is a flow chart illustrating a method of making container with attachment of a radio frequency identification tag.

FIG. 11 is a flow chart that illustrates how the process 100 described herein can be used to manufacture a container for diagnostic reagents. A container can be formed by a commercially available injection molding or blow molding process, as shown in step 102. A stud, or a radio frequency identification tag retainer, upon which a radio frequency identification tag will be mounted can be formed at the same time that the container is formed. By means of an automated system, such as, for example, a robotic system, a radio frequency identification tag can be applied to the stud (or radio frequency identification tag retainer) of the container, as shown in step 104. A staking or a swaging process can then be used to permanently deform the stud (or radio frequency identification tag retainer) in order to mechanically lock the radio frequency identification tag to the stud (or radio frequency identification tag retainer), as shown in step 106. The staking or swaging process can be carried out one by one or a plurality of assemblies simultaneously. The containers, which retain the radio frequency identification tags, can then be transferred to a sterilization station, as shown in step 108. The preferred method of sterilization involves the use of radiation, such as high-energy electron beam, typically higher than 2 Megarads (2 Mrad), or Cobalt source gamma ray sterilization. Alternatively, dry heat, autoclaving, and ethylene oxide can be used to sterilize the containers. After the containers have been sterilized, the containers can be used to store samples, reagents, standard solutions and calibration solutions, reactive mixtures, and other chemicals in liquid form, as shown in step 110. The radio frequency identification tags attached to the containers can then be programmed by means of radio frequency identification interrogators, as shown in step 112. The information stored in the radio frequency identification tag can be related to one or more of the following types of information: identification of the reagent, quantity, expiration dating, shelf life, production information, calibration data, control thresholds, and additional testing requirements and parameters.

The container and method described herein have numerous advantages. The radio frequency identification tag can be attached to a container in a pre-formed concave recess. For example, the radio frequency identification tags can be seated in a radio frequency identification tag protector for enhanced protection of the radio frequency identification tag. The exterior of the container can be characterized as having a smooth appearance. The junction between the radio frequency identification tag and the container will have no pocket for reagent, cleaning solutions, or particulate material, such as dust, to accumulate. The radio frequency identification tags can be attached to sample containers, reagent containers, reaction vessels, multi-well plates, racks for containers, e.g., racks for tubes and bottles, and other types of containers. The method is easy to automate. The method prevents, or at least reduces, counterfeiting. The design is robust, i.e., removal of radio frequency identification tag after attachment to the container is reduced, because removal of the radio frequency identification tag from the container after being attached thereto will likely break the container or the radio frequency identification tag. Furthermore additional strength is provided by the deformed plastic stud or deformed plastic radio frequency identification tag retainer.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An apparatus, comprising:
   a container having a bottom;
   a stud projecting outwardly from the bottom of said container, the stud and the bottom of the container comprising a polymeric material;
   a claw extending from the bottom of the container to grip a seat of a medical instrument, the claw separated by a distance from an identification tag coupled to the stud; and
   an identification tag protector surrounding the bottom of the container, a rim of said identification tag protector extending from said bottom of said container at least as far as said stud.

2. The apparatus of claim 1, wherein the container is to contain a medical product.

3. The apparatus of claim 1, wherein an end of the stud is rounded.

4. An apparatus, comprising:
   a container having a bottom;
   a stud projecting outwardly from the bottom of the said container, an end of the stud being chamfered;
   a claw extending from the bottom of the container to grip a seat of a medical instrument, the claw separated by a distance from an identification tag coupled to the stud; and
   an identification tag protector surrounding the bottom of the container, a rim of said identification tag protector extending from said bottom of said container at least as far as said stud.

5. The apparatus of claim 1, wherein the polymeric material comprises one or more of polypropylene, high density polyethylene, low density polyethylene, polystyrene, polycarbonate, polyvinyl chloride, acrylonitrile-butadiene-styrene copolymers, polyacrylates, thermoplastic polyesters, or polyamides.

6. The apparatus of claim 1, wherein said claw comprises a plurality of flexible extensions.

7. The apparatus of claim 1, wherein the identification tag protector is to protect the identification tag coupled to the stud during shipping, handling, and storage.

8. The apparatus of claim 1, wherein removal of the identification tag brings about damage to the identification tag or to the container or to both the identification tag and to the container.

9. The apparatus of claim 1, wherein the container is a bottle.

10. The apparatus of claim 1, wherein the identification tag includes an opening to receive the stud.

11. The apparatus of claim 1, wherein the stud is to be deformed to mount the identification tag to the bottom of the container.

12. The apparatus of claim 11, wherein the stud is to be deformed by one or more of cold staking, heat staking, thermostaking or ultrasonic staking.

13. The apparatus of claim 1 further comprising a seat having a retention member, the claw to grip the retention member to couple the seat to the bottom of the container.

14. The apparatus of claim 13, wherein the claw is to engage the seat by a friction fit.

15. The apparatus of claim 13, wherein the seat comprises a post projecting outwardly from a bottom side of the seat to rotatably mount the seat on a medical instrument.

16. The apparatus of claim 6, wherein the plurality of flexible extensions are arranged radially around the stud.

17. The apparatus of claim 6, wherein the rim of the identification tag protector extends from the bottom of the container further than the plurality of flexible extensions.

18. The apparatus of claim 1 further comprising a plurality of ribs extending from the bottom of the container, wherein the identification tag is to engage the ribs when the identification tag is mounted to the stud on the bottom of the container.

19. The apparatus of claim 18, wherein the plurality of ribs are radially spaced around the stud.

20. The apparatus of claim 19, wherein the claw comprises a plurality of extensions radially spaced around the ribs.

21. The apparatus of claim 20, wherein the tag protector is radially spaced around the extensions of the claw.

22. The apparatus of claim 1, wherein the identification tag protector has a hemispherical profile.

23. The apparatus of claim 1, wherein the identification tag protector has a cube-shaped profile.

24. An apparatus, comprising:
a container having a bottom;
an identification tag retainer projecting outwardly from the bottom of the container, the identification tag retainer comprising:
an annular element;
an extension projecting outwardly from a periphery of the annular element to define a recess; and
an annular spacing ring on the annular element, the annular spacing ring inset from the periphery of the annular element;
a claw extending from the bottom of the container and disposed radially around the identification tag retainer and separated from the extension of the annular element by a gap, the claw to grip a seat of a medical instrument; and
an identification tag mounted to the identification tag retainer, wherein the extension of the identification tag retainer is to be deformed inwardly over at least a portion of an outer edge of the identification tag to secure the identification tag in the recess of the identification tag retainer.

25. The apparatus of claim 24, wherein the container is to contain a medical product.

26. The apparatus of claim 24, wherein the bottom of the container and the identification tag retainer comprise a polymeric material.

27. The apparatus of claim 26, wherein the polymeric material is selected from one or more of polypropylene, high density polyethylene, low density polyethylene, polystyrene, polycarbonate, polyvinyl chloride, acrylonitrile-butadiene-styrene copolymers, polyacrylates, thermoplastic polyesters, or polyamides.

28. The apparatus of claim 24 further comprising an identification tag protector surrounding the bottom of the container, a rim of said identification tag protector extending from said bottom of said container at least as far as said identification tag retainer.

29. The apparatus of claim 24, wherein said claw comprises a plurality of flexible extensions.

30. The apparatus of claim 28, wherein the identification tag protector is to protect identification tag during shipping, handling, and storage.

31. The apparatus of claim 24, wherein removal of the identification tag brings about damage to the identification tag or to the container or to both the identification tag and to the container.

32. The apparatus of claim 24, wherein the container is a bottle.

33. The apparatus of claim 24, wherein the identification tag is mounted by applying pressure to the extension of the identification tag retainer.

34. The apparatus of claim 33, wherein pressure is to be applied by swaging.

35. The apparatus of claim 24, wherein the identification tag is mounted to the identification tag retainer by one or more of hot plate welding, ultrasonic joining, radio frequency joining or induction bonding.

36. The apparatus of claim 24, wherein the identification tag is to engage the annular spacing ring when the identification tag is mounted to the identification tag retainer.

37. An apparatus, comprising:
a plate having a plurality of wells depending from the plate;
a stud projecting from an exterior surface of the plate, the stud and the exterior surface of the plate comprising a polymeric material;
a claw extending from the exterior surface of the plate to grip a seat of a medical instrument, the claw separated from the stud by a first distance; and
an identification tag protector surrounding the stud, a rim of said identification tag protector extending from said plate at least as far as said stud, the identification tag protector separated from the stud by a second distance, the second distance greater than the first distance.

38. The apparatus of claim 37 further comprising a plurality of studs projecting outwardly from the exterior surface of the plate.

39. An apparatus, comprising:
a plate having a plurality of wells depending from the plate;
an identification tag retainer projecting from an exterior surface of the plate, the identification tag retainer comprising:
an annular element;
an extension projecting outwardly from a periphery of the annular element to define a recess; and
an annular spacing ring on the annular element, the annular spacing ring inset from the periphery of the annular element;
a claw extending from the exterior surface of the plate and disposed radially around the identification tag retainer and separated from the extension of the annular element by a gap, the claw to grip a seat of a medical device; and
an identification tag mounted to the identification tag retainer, wherein the extension is to be deformed inwardly over at least a portion of an outer edge of the identification tag to secure the identification tag in the recess of the identification tag retainer.

40. The apparatus of claim 39 further comprising a plurality of identification tag retainers projecting outwardly from the exterior surface of the plate.

41. The apparatus of claim 39 further comprising an identification tag protector surrounding the identification tag retainer, a rim of the identification tag protector extending from the plate at least as far as said the identification tag retainer.

* * * * *